United States Patent Office 3,030,315
Patented Apr. 17, 1962

3,030,315
POLYMERIZATION OF EPOXIDES
Frederick E. Bailey, Jr., Charleston, W. Va., assignor to Union Carbide Corporation, a corporation of New York
No Drawing. Filed June 29, 1959, Ser. No. 823,362
11 Claims. (Cl. 260—2)

This invention relates to a process for polymerizing epoxide compounds.

In a broad aspect the instant invention is directed to the process for polymerizing vicinal-epoxy hydrocarbon free of unsaturation other than aromatic unsaturation in contact with a catalytically significant quantity of alkali metal naphthalenes to produce useful polymers.

It is deemed appropriate at this time to define the term "reduced viscosity" since this term will be frequently employed in the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature. The reduced viscosity value is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, e.g., acetonitrile or benzene, at 30° C.

Accordingly, one or more of the following objects will be achieved by the practice of this invention.

It is an object of this invention to provide a novel process for polymerizing vicinal-epoxy hydrocarbon free of unsaturation other than aromatic unsaturation in contact with a catalytically significant quantity of alkali metal naphthalenes to produce useful polymers. It is also an object of this invention to provide a novel process for polymerizing an admixture containing two or more different vicinal-epoxy hydrocarbons which are free of unsaturation other than aromatic unsaturation in contact with a catalytically significant quantity of alkali metal naphthalenes as catalysts therefor. Another object of this invention is to prepare solid polymers in accordance with the teachings herein set forth. A further object of this invention is directed to the preparation of resinous poly-(ethylene oxide). Other objects will become apparent to those skilled in the art in the light of the instant specification.

The vicinal-epoxy hydrocarbons free of unsaturation other than benzenoid unsaturation, i.e., vicinalepoxy hydrocarbons which have a single vicinal epoxy group and which are free from unsaturation other than benzenoid unsaturation, which can be employed in the polymerization process of the invention can be characterized by the following formula:

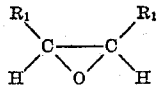

wherein each $R_1$, individually, can be hydrogen or a hydrocarbon radical free from ethylenic and acetylenic unsaturation such as, for example, alkyl, aryl, cycloalkyl, aralkyl, or alkaryl radicals. In addition, both $R_1$ variables can represent a divalent saturated aliphatic hydrocarbon radical which together with the epoxy carbon atoms, i.e., the carbon atoms of the epoxy group

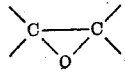

form a saturated cycloaliphatic hydrocarbon nucleus containing from 4 to 10 carbon atoms, preferably from 4 to 8 carbon atoms, such as, for example, a nucleus derived from cycloalkane, alkyl-substituted cycloalkane, cyclobutane, cyclopentane, cyclohexane, cycloheptane, cyclooctane, 2-methylcyclopentane, 3-amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, benzyl, tolyl, ethylphenyl, butylphenyl, phenethyl, phenylpropyl, cyclopentyl, cyclohexyl, 2-methylcyclohexyl, cycloheptyl, and the like.

Illustrative vicinal-epoxy hydrocarbons which can be employed in the polymerization process of this invention include, for example, ethylene oxide, propylene oxide, 1, 2-epoxybutane, 2,3-epoxybutane, the epoxypentanes, the epoxyhexanes, the epoxyheptanes, 2,3-epoxyheptane, 5-butyl-3,4-epoxybutane, 1,2-epoxydodecane, 1,2-epoxyoctadecane, styrene oxide, ortho-, meta-, and para-ethylstyrene oxide, the oxa-bicycloalkanes, e.g., 7-oxabicyclo[4.1.0]heptane, 6-oxabicyclo[3.1.0]hexane, 4-propyl-7-oxabicyclo[4.1.0]heptane, and the like. The lower olefin oxides, that is, ethylene oxide, propylene oxide, and the epoxybutanes are especially suited to prepare high molecular weight products. A single, vicinal-epoxy hydrocarbon or an admixture of at least two different vicinal-epoxy hydrocarbons can be employed as the monomeric feed. In polymerizing an admixture comprising two different vicinal-epoxy hydrocarbons, it is preferred that one of them be a lower olefin oxide.

The alkali metal naphthalenes, e.g., lithium naphthalene, sodium naphthalene, potassium naphthalene, and the like are employed in catalytically significant quantities, and, in general, a catalyst concentration in the range of from about 0.01, and lower, to about 5.0 weight percent, and higher, based on the total weight of monomeric material, is suitable. A catalyst concentration of from about 0.1 to about 3.0 weight percent is preferred. For optimum results, the particular catalyst employed, the nature of the monomeric reagent(s), the operative temperature at which the polymerization reaction is conducted, and other factors will largely determine the desired catalyst concentration. It is pointed out that the alkali metal naphthalenes are well known to the art. For instance, the preparation of the alkali metal naphthalenes is disclosed in U.S. Patent No. 2,019,832.

The polymerization reaction can be effected over a wide temperature range. In general, a reaction temperature in the range of from about 0° C., and lower, to about 150° C. is suitable. A reaction temperature in the range of from about 20° to about 100° C. is preferred. As a practical matter, the choice of the particular temperature at which to effect the polymerization reaction depends, to an extent, on the nature of the vicinal-epoxy hydrocarbon reagent(s) and particular catalyst employed, the concentration of the catalyst, and the like.

In general, the reaction time will vary depending on the operative temperature, the nature of the vicinal-epoxy hydrocarbon reagent(s) employed, the particular catalyst and the concentration employed, the choice and amount of an inert, normally-liquid organic vehicle, and other factors. The reaction time can be as short as a few hours in duration or it can be as long as several days.

When polymerizing an admixture containing two different vicinal-epoxy hydrocarbons, the proportions of said vicinal-epoxy hydrocarbons can vary over the entire range. Preferably the concentration of either monomeric vicinal-epoxy hydrocarbon is in the range of from about 5 to about 95 weight percent, based on the total weight of said vicinal-epoxy hydrocarbons.

The polymerization reaction preferably takes place in the liquid phase. Preferably, the polymerization reaction is conducted under an inert atmosphere, e.g., nitrogen. It is also desirable to effect the polymerization process under substantially anhydrous conditions.

The polymerization reaction can be carried out in the presence of an inert, normally-liquid organic vehicle such as, for example, aromatic compounds, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl substituted cyclic saturated hydrocarbons such as pentane, hexane, heptane, various normally-liquid petroleum hydrocarbon fractions, cyclohexane, the alkylcyclohexanes, dicahydronaphthalene, and the like.

An induction period may be observed in that the polymerization is not initiated immediately. The induction period can be as short as minutes in length with the more active catalysts or it can be several hours in duration. This induction period depends, for example, on the individual catalyst employed, its preparation, the nature of the monomeric feed, the reaction temperature, the purity of the monomeric feed, and other factors.

Unreacted monomeric reagent can be recovered from the reaction product by conventional techniques such as distillation. If desired, the polymer product can be washed with an inert, normally-liquid organic vehicle, e.g., pentane, heptane, etc., in which the polymer product is insoluble and the monomeric reagent is soluble. The washed polymer product can then be recovered, dried in a vacuum, e.g., about 10 to 50 mm. of Hg, at elevated temperatures, e.g., about 30° to 45° C. Another route involves dissolution in a first inert, normally-liquid organic vehicle, followed by addition of a second inert, normally-liquid organic vehicle which is miscible with the first organic vehicle but which is non-solvent for the polymer, thus resulting in precipitating the polymer product. The precipitated polymer is readily recovered by filtration, decantation, etc., followed by drying same under reduced pressure at slightly elevated temperatures.

The products of the polymerization process are valuable and useful polyethers. The viscous liquid to wax-like polymers can be employed as solvents, raw materials and plasticizing agents for resins, and the like. The solid polymers are useful for the production of various shaped articles, e.g., buttons, brush handles, etc. The polymers are also useful as lubricants, vehicles, and intermediates in industries such as the food, pharmaceutical, textile, and petroleum industries. Resinous ethylene oxide polymers are useful as sizing agents, coagulants, and water-soluble lubricants. The water-soluble and water-insoluble solid polymers are also useful in the preparation of films by conventional techniques such as by milling on a two-roll mill, calendering, solvent casting, and the like.

In illustrative examples below, the procedure employed, unless noted otherwise, to prepare the polymer was as follows. A 9-inch Pyrex tube 22 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere. The tube was then closed with a rubber cap, followed by cooling in Dry Ice-acetone bath; the tube was sealed under the vacuum thus obtained. The sealed tube was subsequently inserted into an aluminum block which was agitated by rocking at the desired operating temperature for a given period of time. After this, the tube was broken open and the reaction product was freed of unreacted monomer, if any, by drying same under reduced pressure at slightly elevated temperature.

*Example 1*

To a Pyrex glass tube, there were charged 30 grams of propylene oxide and 0.06 gram of potassium naphthalene. The tube was sealed and then inserted into an aluminum block which was gently agitated for a period of 47 hours at 90° C. At the end of this period of time the tube was broken open and the reaction product was freed of unreacted monomer by drying same under reduced pressure at slightly elevated temperature. There was obtained 12 grams of a water-insoluble polymer which had a reduced viscosity value of 0.11 in benzene.

In an analogous manner, an admixture containing 85 parts by weight of ethylene oxide and 15 parts by weight of propylene oxide can be copolymerized in the presence of 2 parts by weight of potassium naphthalene, under the operative conditions noted above, to give a solid, water-soluble copolymer.

*Example 2*

To a Pyrex glass tube, there were charged 30 grams of ethylene oxide and 0.03 gram of potassium naphthalene. The tube was sealed and then inserted into an aluminum block which was gently agitated for a period of 96 hours at 25° C. At the end of this period of time the tube was broken open and the reaction product was freed of unreacted monomer by drying same under reduced pressure at slightly elevated temperature. There were obtained 18 grams of a hard, firm, water-soluble polymer which had a reduced viscosity value of 0.7 in acetonitrile.

In an analogous manner, propylene oxide can be homopolymerized in the presence of 0.5 weight percent sodium naphthalene, under the operative conditions noted above, to give a solid, water-insoluble polymer.

*Example 3*

To a Pyrex glass tube, there were charged 30 grams of ethylene oxide and 0.03 gram of potassium naphthalene. The tube was sealed and then inserted into an aluminum block which was gently agitated for a period of 96 hours at 25° C. At the end of this period of time the tube was broken open and the reaction product was freed of unreacted monomer by drying same under reduced pressure at slightly elevated temperature. There were obtained 16 grams of a hard, firm, water-soluble polymer which had a reduced viscosity value of 0.9 in acetonitrile.

In an analogous manner, 1,2-butylene oxide can be homopolymerized in the presence of 1.0 weight percent potassium naphthalene, under the operative conditions noted above, to give a paste-like, water-insoluble polymer.

*Example 4*

To a Pyrex glass tube, there were charged 30 grams of ethylene oxide and 0.03 gram of sodium naphthalene. The tube was sealed and then inserted into an aluminum block which was gently agitated for a period of 17 days at 25° C. At the end of this period of time the tube was broken open and the reaction product was freed of unreacted monomer by drying same under reduced pressure at slightly elevated temperature. There were obtained 10 grams of a hard, firm, water-soluble polymer which had a reduced viscosity value of 0.6 in acetonitrile.

Although the invention has been illustrated by the preceding examples, the invention is not to be construed as limited to the materials employed in the above-said exemplary examples, but rather, the invention encompasses the generic area as hereinbefore disclosed. Various modifications and embodiments of this invention can be made without departing from the spirit and scope thereof.

What is claimed is:

1. A process which comprises contacting as the sole reactive ingredient a vicinal-epoxy hydrocarbon which has a single vicinal epoxy group and which is free from unsaturation other than benzenoid unsaturation, with a catalytically significant quantity of an alkali metal naphthalene as the catalyst for polymerizing said vicinalepoxy hydrocarbon, for a period of time sufficient to produce a polymer.

2. A process which comprises contacting an admixture containing as the sole reactive ingredients at least two vicinal-epoxy hydrocarbons which have a single vicinal epoxy group and which are free from unsaturation other than benzenoid unsaturation; with a catalytically significant quantity of an alkali metal naphthalene; for a period of time sufficient to produce a copolymer.

3. A process which comprises contacting a vicinal-epoxy hydrocarbon characterized by the following formula

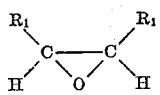

wherein each $R_1$, individually, is selected from the group consisting of hydrogen, a hydrocarbon radical free from ethylenic and acetylenic unsaturation, and radicals which together with the epoxy carbon atoms shown in the above formula form a saturated cycloaliphatic hydrocarbon nucleus containing from 4 to 10 carbon atoms; with from about 0.01 to about 5.0 weight percent based on the weight of said vicinal-epoxy hydrocarbon, of an alkali metal naphthalene selected from the group consisting of lithium naphthalene, sodium naphthalene, and potassium naphthalene, as the catalyst for polymerizing said vicinal-epoxy hydrocarbon; at a temperature in the range of from about 0° to about 150° C.; and for a period of time sufficient to produce polymer.

4. The process of claim 3 wherein said vicinal-epoxy hydrocarbon contains from 2 to 4 carbon atoms.

5. The process of claim 4 wherein said catalyst is sodium naphthalene.

6. The process of claim 4 wherein said catalyst is potassium naphthalene.

7. A process which comprises contacting an admixture containing as the sole reactive ingredients at least two vicinal-epoxy hydrocarbons which have a single vicinal epoxy group and which are free from unsaturation other than benzenoid unsaturation, one of said vicinal-epoxy hydrocarbons being ethylene oxide; with from about 0.01 to about 5.0 weight percent, based on the total weight of said vicinal-epoxy hydrocarbons, of a catalyst selected from the group consisting of lithium naphthalene, sodium naphthalene, and potassium naphthalene; at a temperature in the range of from about 0° to about 150° C.; and for a period of time sufficient to produce a copolymer.

8. The process of claim 7 wherein said vicinal-epoxy hydrocarbons are ethylene oxide and propylene oxide.

9. A process which comprises contacting ethylene oxide with a catalytically significant quantity of an alkali metal naphthalene selected from the group consisting of lithium naphthalene, sodium naphthalene, and potassium naphthalene, at a temperature in the range of from about 20° to about 100° C., and for a period of time sufficient to produce solid poly(ethylene oxide).

10. The process of claim 9 wherein said catalyst is sodium naphthalene.

11. The process of claim 9 wherein said catalyst is potassium naphthalene.

References Cited in the file of this patent

UNITED STATES PATENTS

| | | |
|---|---|---|
| 2,641,614 | Britton et al. | June 9, 1953 |
| 2,870,100 | Stewart et al. | Jan. 20, 1959 |
| 2,917,470 | Bressler et al. | Dec. 15, 1959 |